United States Patent [19]

Belmares-Sarabia et al.

[11] 4,272,780
[45] Jun. 9, 1981

[54] FILM SCANNER WITH VARIABLE RATE IMAGE ENHANCEMENT

[75] Inventors: Armand Belmares-Sarabia, St. James, N.Y.; Stanley J. Chayka, Parsippany, N.J.; Robert M. Lund, New York, N.Y.

[73] Assignee: Teletronics International, Inc., New York, N.Y.

[21] Appl. No.: 914,575

[22] Filed: Jun. 9, 1978

Related U.S. Application Data

[62] Division of Ser. No. 700,852, Jun. 29, 1976, Pat. No. 4,096,523.

[51] Int. Cl.$^2$ ............................................. H04N 5/30
[52] U.S. Cl. .................................... 358/54; 358/162; 358/214
[58] Field of Search .................. 358/54, 80, 162, 166, 358/214

[56] References Cited

U.S. PATENT DOCUMENTS

3,800,077  3/1974  Smith .............................. 358/162 X

Primary Examiner—Robert L. Richardson

[57] ABSTRACT

The system and method are used to convert images on motion picture film or slides to video signals. Color corrections in the video signals are made by adjusting not only the color balance, but also the color hue and saturation, as well as the separate component parts of the luminance signal. During the first phase of operation, the "load" mode, a "standard" set of color correction values is selected so as to provide a video picture which is pleasing to the eye. Then the whole film is color-corrected by providing incremental adjustment signals to be added to or subtracted from the "standard" values for each different scene on the film. The incremental adjustment values are stored in the memory of a digital computer. A frame counter provides a count of the frame at which a color correction is made. Furthermore, each color correction of a frame is given an "event" number. The event and frame numbers are stored together with the adjustment values for each scene or frame. During the second phase of operation, the "run" mode, a video tape recording of the color-corrected video signals is produced by re-running the motion picture film through the system, while reference values for the color corrections, together with incremental values previously stored, are read out, added together, and sent through a film chain. The color-corrected video signals from the film chain are sent to a video tape recorder which records them in a continuous record on tape.

5 Claims, 7 Drawing Figures

FILM SCANNER WITH VARIABLE RATE IMAGE ENHANCEMENT

This is a division of U.S. application Ser. No. 700,852, filed June 29, 1976, and now U.S. Pat. No. 4,096,523.

This invention relates to systems and methods for the color correction of video signals, and particularly to the electronic color correction of video signals produced from motion picture or other film.

The system and method of electronic color correction of motion picture film shown in U.S. Pat. No. 3,610,815 (known as the "Chromaloc" System and Method of Teletronics International, Inc., New York, New York) has provided a major step forward in the art. Despite its excellence, there has been room for even further advances in the art. Some of the problems which remain unsolved are the following:

Although it has been possible to correct the color balance and total luminance of color video signals, it previously has not been possible to provide scene-by-scene correction of the hue and saturation of the colors. Accordingly, the correction of colors in the past has not been as nearly complete as desirable.

Another problem is that the spectral response of the colors in motion picture and other photographic film usually is not matched to the spectral distribution of the components used to form the total luminance signal in the usual film-to-video converter or "film chain". The result is that the luminance signal produced in the film chain usually does not correspond properly to the color components of the motion picture film.

A further problem has been the fact that in a color correction system the motion picture projectors are run at varying speeds, and are stopped frequently in order to produce "still frames" for viewing while making color corrections. It has been found that the edge sharpness or contrast changes with the speed of the motion picture projectors. Thus, when the projectors stop to provide a "still frame" for color correction purposes, the detail enhancement is too great. However, when the projector is run at a relatively high speed, the detail enhancement is too low. In either case, the video pictures are considerably less than ideal for use in the color correction system.

Another problem has been that it has not been possible in the past to effectively store color correction signals for use at a later time in producing new video tape. The problem has been that the characteristics of the film chain and color correction system usually change with age significantly so that the original color corrections are not suitable for use at a later date. Thus, the color correction process usually must be re-performed each time a new video tape record is to be produced for the same film.

In view of the foregoing, it is an object of the present invention to provide an image-to-video converter, and color correction system and method which overcome the foregoing problems. Furthermore, it is an object to provide a system and method in which new types of color corrections can be made in order to give greater control of the color composition of the ultimate video picture. It is a further object to provide such improvements in a form in which they can easily be utilized by operating personnel, and with a minimum of equipment and expense. In general, it is an object to minimize the labor and time required for color correction, while maximizing the quality of color correction produced.

The foregoing objects are met, in accordance with the present invention, by the provision of a color correction system and method in which standard levels initially are set for color correction signals, and then the color of each scene of a motion picture or other film is corrected by setting and storing the incremental values of the correction signals needed to be added to or subtracted from the standard values to give a good color-corrected video picture. Additionally, means are provided for indicating the location of the color correction changes. Preferably, these location signals are stored with the correction signals. Then, in order to produce a video tape recording, the motion picture film is re-run, and the adjustment signals which were stored are read out of memory and added to reference signals for the color correction values, and the resulting signals are used to control the color components in the video tape recording.

The incremental values can be stored in an auxiliary storage means such as punched paper tape and can be used at a later date when another video tape recording is desired to be made. The reference levels for the color component signals can be re-set at this later time so as to make adjustments, where necessary, due to aging of the components of the film chain system. Since only incremental values are stored, by this re-definition of the reference or standard correction values, the incremental color correction signals can be re-used many times, thus avoiding the labor of re-correcting the same film each time a new video recording is desired.

A new system and method of electronic color control is provided by separately varying the primary color component video signals used to form a total luminance signal in a film-to-video converter or "film chain". It has been found that this compensates for differences between the spectral composition of the colors in the film and the colors normally seen by video cameras when scanning the actual objects being depicted. The adjustments in the primary color components are stored and used in color correction in the manner described above.

The color correction system also is provided with a means for adjusting, storing and utilizing separate adjustment signals for the hue and saturation levels of the primary colors and their complements, thus providing greater control over the color correction process.

A system is provided for automatically varying the amount of image enhancement produced in the film chain. The amount of enhancement varied directly with the speed of the motion picture projector used to project the images from the film to the film camera. Thus, the image enhancement and contrast will be good both while the motion picture projector is being run at its highest speed, and while either a still-frame is being displayed, or when slides are being shown.

Instead of using a plurality of groups of potentiometers for adjustment and storage of the correction signals, a single bank of potentiometers is used, with the settings of the potentiometers for each color correction being stored in the memory of a digital computer. Means are provided for quickly returning each of the potentiometers to its starting position after the settings have been stored in memory in order to prepare the potentiometers for a new color correction. A highly advantageous potentiometer return structure has been provided simply by attaching the potentiometer rotor to a rotor which rotates inside of a stator, with electromagnetic means for producing a magnetic field coupling the rotor and stator. When it is desired to return the potentiometers to their starting positions, the electromagnetic means is energized so as to develop a magnetic field, and the potentiometer quickly rotates to a position in which the rotor and stator are properly aligned in the magnetic field. This is performed within the blanking period of the picture so as not to interfere with the generation of video signals.

The foregoing and other objects and advantages of the invention will be pointed out in or apparent from the following description and drawings:

GENERAL DESCRIPTION

Figures 1, 2:
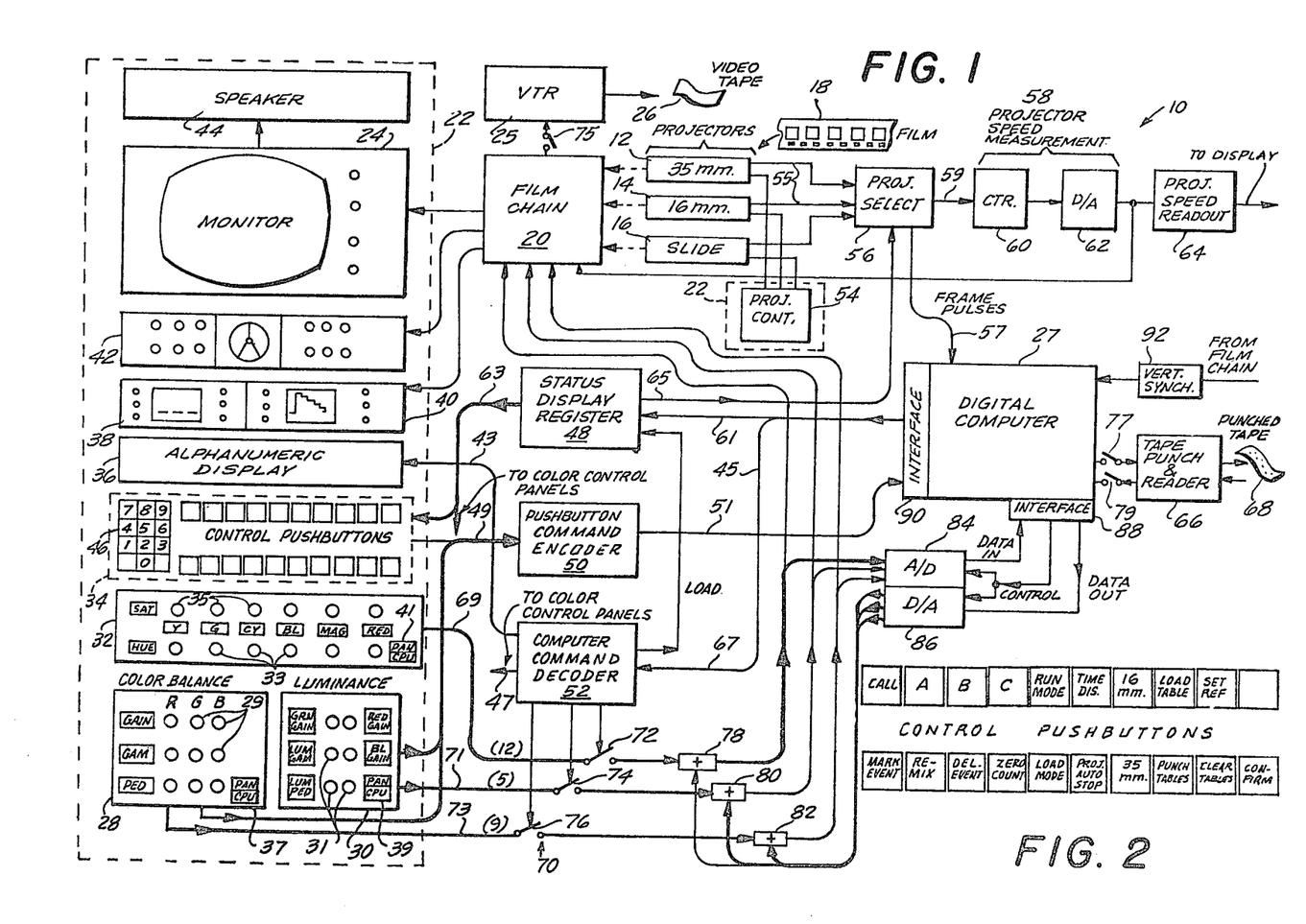
FIG. 1 is a partially-schematic circuit diagram of the color correction system of the present invention.
FIG. 2 is an enlarged view of the control pushbuttons of FIG. 1.

FIG. 1 shows a color correction system 10 for correcting color of video signals produced from motion picture film 18 by a motion picture ("telecine") projector 12 or 14, or slides presented by a slide projector 16. The images are sent to a film-to-video converter ("film chain") 20 which converts the images into video signals. The color components of the video signals are corrected with the aid of a color correction control panel 22. The video signals are displayed on a monitor screen and, after correction, are recorded in a video tape recorder 25 which produces a continuous color-corrected video tape recording of the motion picture film or slide.

A digital computer 27 is used for storage of correction data, for performing the control computations, and for directing and timing the operations of the system.

A tape punch and reader 66 are provided for reading stored color correction signals out of the computer memory and storing them in the form of a punched paper tape 68. The reader then can be used at a later time to re-store the information in the computer for use in preparing a new video tape recording of a previously corrected motion picture film.

CONTROL PANEL

The control panel 22 includes three separate color control panels (sub-panels) 28, 30 and 32, an operational control panel 34, and an alphanumeric display panel 36. Oscilloscopes 38 and 40 are provided, respectively, for indicating the chrominance and luminance of the video signal. A vectroscope 42 also is provided, and a loud speaker 44 is provided for monitoring the soundtrack of the film.

The color balance control panel 28 includes nine control potentiometers 29 for controlling the balance between the red, green and blue color components of the video signals. One control potentiometer 29 is provided to control each of the gain, the gamma, and the pedestal levels for each of the red, green and blue components. The control provided by the color balance control panel 28 corresponds roughly to that provided in the above-identified U.S. Pat. No. 3,610,815.

The luminance control panel 30 includes five potentiometers 31. Three potentiometers are used to control the gain of the red, blue and green signals used in forming a luminance signal. Another potentiometer is used to control the gamma of all three of the red, green and blue signals, and a fifth potentiometer is used to control the pedestal of all of those three signals. The effect of operating these controls is to vary the spectral distribution of the luminance signal.

The hue and saturation control panel 32 provides six potentiometers 33 for correcting the hue of the three primary and three complementary colors of the video signals, and six potentiometers 35 for controlling the saturation level of those six color components.

The operational control panel 34 includes two rows of control push buttons, which are shown enlarged in FIG. 2, and a numerical pushbutton sub-panel used in addressing the computer 27 to call-up certain specified events.

The alpha-numeric display panel 36 displays information regarding what state the control system is in, the information which is being called up or operated upon, etc. in order to assist the operator in operating the equipment.

DATA STORAGE AND OPERATIONAL CONTROLS

The projectors 12, 14 and 16 are controlled by a projector control unit 54 of conventional construction. The projector control structure actually forms a part of the control panel 22, and this is indicated in FIG. 1 by the dashed outline around the unit 54. By means of the projector control unit 54, the projectors 12 and 14 can be run at variable speeds in the forward direction, they can be reversed, and stopped wherever desired so as to display a given film frame on the monitor 24. Also, the projector that is to be operated can be selected by means of a projector selection circuit 56.

Each of the projectors 12 and 14 has a pulse generator (not shown) for generating one pulse for every frame of the motion picture film. This pulse is generated during the shutter pull-down time of the projector. These pulses are delivered to the projector selection circuit over lines 55, and then are delivered to the digital computer 27 over a line* 57. The digital computer counts the frame pulses and thus develops a frame location signal.

*When the term "line" is used in this specification, it should be understood that the term means one or more conductors. Actually, most of the lines shown in FIG. 1 consist of several different conductors. The number of conductors necessary will be readily evident to one of ordinary skill in the art.

The frame pulses also are delivered over a line 59 to a projector speed measurement circuit 58 consisting of a counter 60 feeding a digital-to-analog converter 62. The output of the speed measurement circuit 58 is delivered to a projector speed readout circuit 64, which delivers signals to the display panel 36 to display the projector speed.

The color correction system is operated by means of the operation control panel 34 with the assistance of the computer 27. The signals from the control push buttons are delivered over a line 49 to a conventional pushbutton command encoder circuit 50 which converts the pushbutton signals into properly coded information for use by the computer 27. The encoded commands are delivered over a line 51 to the computer 27 through a conventional interface circuit 90.

The pushbutton command encoder 50 also receives signals from two push buttons labeled PAN and CPU, items 37, 39 and 41 on the three color control panels 28, 30 and 32. These push buttons can be operated to select between the "panel" and "CPU" modes of operation, which will be described in detail below.

The computer 27 is of a conventional type. Specifically, a computer which has been found to work satisfactorily is the PDP-11 general purpose mini-computer manufactured by Digital Equipment Corporation with an 8K-bytes capacity magnetic core memory.

The computer 27 is programmed by conventional programming techniques, and delivers appropriate commands over a line 45 to a computer command decoder circuit 52 which delivers operational commands to each of the three color control panels 28, 30 and 32 over a line 47, and to the alpha-numeric display 36 over a line 43.

The computer 27 sends status signals over lines 61 and 67 to a status display register 48, and to the computer command decoder 52, respectively. The status display register 48 sends signals over a line 63 to the control pushbutton panel 34 and each of the color control panels 28, 30 and 32 to light lamps behind those of the push buttons which are energized to indicate which of the push buttons has been pushed. Similar signals are sent over a line 65 to the projector selector unit 56.

The settings of the saturation and hue potentiometers 35 and 33 are delivered over a line 69 through a switch 72 and a summing amplifier 78 to an anglog-to-digital converter 84 and an interface 88 to the computer 27. Data from the computer is sent through the interface 88 to a digital-to-analog converter 86, which delivers corresponding analog signals as an input to the summing amplifier 78. Control signals for the converters 84 and 86 are delivered from the computer 27 through the interface 88.

Similarly, the signals on the color balance potentiometers 29 and the luminance potentiometers 31 are delivered over lines 73 and 71, respectively, through switches 74 and 76, summing amplifiers 80 and 82, and the converter 84 to the computer 27. Data from the converter 86 is sent to the summing amplifiers 80 and 82.

The outputs from the summing amplifiers 78, 80 and 82 also are delivered to the film chain 20 to provide it with color correction signals.

The three switches 72, 74 and 76 are electronic switches which together form a switching circuit 70. The operation of the switches is controlled by the CPU; that is, the central processing unit of the digital computer 27.

When the color correction system is in the "load" mode (to be described in detail below), the pair of push buttons 37, 39 or 41 on each panel can be used to select whether that panel is to be operated in the "panel" mode or in the "CPU" mode. In the "panel" mode, the switch 72, 74, or 76 is closed, and the digital-to-analog converter 86 delivers the "standard" or "reference" set of color correction signals to the summing amplifier 78, 80 or 82.

When the "CPU" button is pushed, the switch 72 or 74 or 76 is open, and the digital-to-analog converter 86 delivers previously-stored correction information which then modifies the picture on the monitor 24 so that the effect of previous color corrections on the images currently being corrected can be seen.

During the "run" mode (to be described in detail below), the switches 72, 74 and 76 are closed, and the digital-to-analog converter 86 delivers stored correction signals for use in producing color-corrected video tape. Since the switches 72, 74 and 76 are closed during the "run" mode, it still is possible to alter the color corrections manually by operation of the potentiometers in the color control panels.

OPERATION

The operation of the system 10 will be described when in use in color-correcting 35 millimeter motion picture film.

A. Preliminary Procedures

Referring to FIG. 2, one would first push the "clear tables" button to erase all previous data stored in the computer, and to otherwise prepare it for a new color correction operation.

The "35 mm" button then is passed to operate the projector selection unit 56 to select the 35 mm projector 12 and enable it to operate while disabling the projectors 14 and 16. Operation of the projector selection unit 56 causes certain other operations in the system which will be described below.

The projector control unit 54 is used to start the projector 12 and to find the first frame on the film. When the first frame is found, the projector is stopped with the first frame displayed by the monitor 24, and the "zero count" push button (FIG. 2) is pressed to reset the frame counter which is a part of the digital computer 27 to zero.

If it is desired to preview the entire film and decide where color corrections are needed before actually making the color corrections, this can be done by running the film through a projector or "movieola" machine until the location of a color correction (e.g., a scene change) is detected, stopping the movieola at that location, and entering into a paper tape or other storage means the location of the frame where the color correction is desired. Then, to start the color correction process, the tape is run through the tape reader 66, and the scene change locations are stored in the computer 27. When the film is run through the projector 12, the scene change locations are used to stop the projector at the proper location so that color corrections can be made.

B. Load Mode

The film is previewed to find a "typical" frame in the film to serve as a basis for setting "standard" or "reference" values for the color correction components in the picture. When the "typical" frame is found, the "load mode" button is pushed to place the system in a condition in which color correction information can be loaded into it.

When the "load mode" button is pushed, the color control panels are switched into the "panel" mode, and this causes the switches 72, 74 and 76 to close. Then the saturation and hue potentiometers, color balance potentiometers and luminance potentiometers can be adjusted to produce a picture with a correct appearance on the monitor screen 24. The values of each of these adjustment voltages is stored in the digital computer 27 by pressing the "set reference" push button and the "confirm" button. In this manner, standard or reference values of color corrections are stored in the computer.

Next, the projector is reversed and run back to the starting position. Color corrections, if needed, are made by adjusting the setting of the color control potentiometers in the three panels 28, 30 and 32. At this time, the computer supplies the "standard" color component signals to the summing amplifiers 78, 80 and 82 through the converter 86. Thus, the signals delivered to the film chain 20 are composite signals which are the algebraic sum of the standard color correction signals stored in the computer and the new settings of the color control potentiometers. Since each potentiometer is capable of either increasing or reducing the color correction voltage it controls, the composite signal delivered to the film chain can be either greater or lower than the standard signal. The difference between the standard values and the new values are called "incremental" values.

When a desirable color mixture has been achieved so that the picture shown on the monitor 24 is pleasing, the "mark event" button is pushed. This causes the signals at the outputs of the summing amplifiers 78, 80 and 82 to be delivered through the analog-to-digital converter 84 to the computer. In the computer, the standard values are subtracted from the incremental values, and only the incremental values are stored in the computer memory. At the same time, the frame number of the frame at which the correction has been made is stored in memory, as well as an "event" number to identify the color correction event.

If it is decided that, for some reason, the results of the color correction are not satisfactory, the control potentiometers can be readjusted, and the "re-mix" button can be pushed. This will erase the previously stored incremental values from memory and allow them to be replaced with new incremental values.

The projector then is started again and run until the next color correction location is detected. The projector is stopped, and the control potentiometers are operated once again in the same manner, and the new incremental values, event number and frame number of the new color correction are entered in memory by pressing the "mark event" button. The event number automatically increases by one for every new event which is entered.

The foregoing process is repeated for each other frame that needs color corrections until incremental values have been stored in the memory for the entire film.

Sometimes during the color correction of a length of film, it may be desirable to test previous color correction settings to see if they will adequately correct the color of the new scene. This might occur, for example, when different scenes in a film strip are taken by the same motion picture camera but appear at different places in the film. It is often possible to save a substantial amount of time and labor if the same corrections can be used for a new scene. This can be accomplished by pressing the "call" push button and entering the number of the event which it is desired to recall by pressing the appropriate numbered pushbuttons in the panel 46. By this means, the color corrections from that previous event are applied to the current video picture.

Sometimes it is desired to compare the color corrections provided by one or two prior correction settings with the current picture. This can be accomplished by pressing either of the "A" or "B" push buttons after having pressed the "call" and event number buttons. This will cause those new settings to be stored in separate parts of the memory so that they can be recalled instantly by simply pressing either the "A" or "B" push button. Pressing any of the "A", "B" or "C" buttons automatically causes switches 37, 39 and 41 to switch into the CPU mode. Pressing the push button "C" always will display the current event on the monitor 24. Thus, the effects of up to three different color corrections can be compared rapidly in sequence simply by pressing of the "A", "B" and "C" buttons. If a previous setting appears to be satisfactory, it can be entered as the color correction setting for the new frame by simply pressing the "mark event" button to store it in the memory, the same as any other setting. If adjustment of some color parameter is desired, the switches 37, 39 or 41 (or any combination of those switches) is operated to switch the corresponding sub-panels into the "Panel" mode. Then further changes can be made by operating the potentiometers in that sub-panel and pressing the "mark event" button when the scene is satisfactory. This saves labor and time which might be needed to make a completely new mix.

The location of the picture currently being displayed is shown on the display panel 36 at all times. The location can be presented in any of three unit values; the actual number of frames from the zero starting position; or in units of feet and numbers of frames, of film between the frame location and starting position; or in terms of elapsed time (running time since the start of the film) and frames. Either of these three modes of presentation can be selected by pressing the "time display" button in FIG. 2. Pressing this button once will change the mode of display to the next one, and so forth.

The conversion from one of the units of frame location to another is performed by suitable programming of the digital computer 27, which uses the frame pulses received from the projection selection unit 56 in performing the computations.

In accordance with another feature of the present invention, the same color control potentiometers are used for all color corrections. This is made possible by means of an automatic return mechanism which returns the potentiometers to a starting position (zero) very rapidly. This happens automatically upon the coincidence of the pressing of the "mark event" button and a vertical synchronization pulse. The return requires only 1.8 milliseconds, which places it well within the vertical interval of the video picture. This prevents any interference between the former potentiometer settings and the video picture being displayed on the screen 24.

C. Run Mode

When all of the corrections have been made in the film and it is desired to make a video tape recording, the "run mode" button is pushed. The projector is reversed and run back to the starting position. The switch 75 which has previously been opened is now closed in order to enable the video tape recorder 25 to operate. Then the projector 12 is started in the forward direction. As it runs, each of the switches 72, 74 and 76 is closed so that the color control potentiometers are enabled. Under the control of the frame count, the computer automatically adds the stored incremental values to the stored "standard" or reference values, delivers them to the digital-to-analog converter 86, through the summing amplifiers 78, 80 and 82, to the film chain to modify the video signals and produce a color-corrected video recording.

During the run mode, all of the color correction signals are applied to the video circuits in the film chain during the vertical interval of the video signals so that undesirable transients will not be developed. This operation is synchronized by means of a vertical synchronization circuit 92 which delivers synchronizing pulses to the computer 27. This synchronizing circuit is substantially the same as that shown in U.S. Pat. No. 3,610,815, and will not be described in detail here.

Because each of the color control potentiometers is enabled during the run mode, manual adjustment can be made as desired. For example, it may be that a gradual change of a certain color component during a scene is desired in order to produce a special effect. This can be done by manual operation of one or more color control potentiometers.

It should be indicated at this point that although it is stated that this patent application deals with "color correction" the system is so flexible that it goes a long way towards actually creating new color combinations that did not exist in the film. It should be understood, therefore, that the term "correction" as used in this description includes the establishment of totally new color combinations.

D. Auxiliary Storage Mode

If it is desired to provide long-term storage for color correction information, the "punch tables" button is pushed, the switch 77 to the tape punch and reader unit 66 is closed, and the incremental color values are read out of the computer and punched into the paper tape 68, together with the frame count and event information. The location of the "standard" frame also is stored, along with the "standard" correction values for that frame.

E. Re-Use of Previous Corrections

If, at a later time, it is desired to re-use the color corrections stored in the punched tape 68 to provide a new video tape for the same film strip, this can be done, in accordance with the invention, by pushing the "load table" button, closing the switch 79 and operating the tape reader to read the information from the punched tape back into the computer 27. Also, the original film is placed in the projector 12.

At this point one of the advantages of the invention becomes apparent. The location of the previous "standard" frame which was used to make the standard color correction can be determined and that frame can be recalled by the techniques described above. That frame can be displayed on the monitor with the previous "standard" color correction settings. If the "standard" corrections still are suitable, no change need be made. However, it is a fact that the optical elements of the film chain and certain other elements of the system shown in FIG. 1 tend to age relatively rapidly and change their color characteristics. Therefore, color corrections which were made in one week well might not be applicable to the same equipment the following week, or only a few days later. The "standard" correction values can be adjusted by the means described above, and new reference levels can be stored in the computer 27. Then, the projector can be started over again, the system placed in the run mode, and a new video tape with proper color corrections will be produced despite the change in color characteristics due to aging of the system.

By the technique of using a "standard" signal and storing only incremental color correction values, it is possible to make many video tape records at varying points in time without having to re-make the color corrections. This gives considerable savings in labor, reduces usage of the color correction system, and improves the productivity of its use.

Another advantage of the incremental correction storage technique is that it increases the resolution of the digital storage system storing corrections, and of the potentiometers. Thus, for example, instead of using 256 data bits to encode 8 volts, it can be used to encode 2 volts, thus increasing the encoding resolution and accuracy. The potentiometers need control only 2 volts, instead of 8, thus making it possible to reduce the number of revolutions of the potentiometer to produce a desired control signal. This speeds operation of the system.

FILM CHAIN

Figure 3:
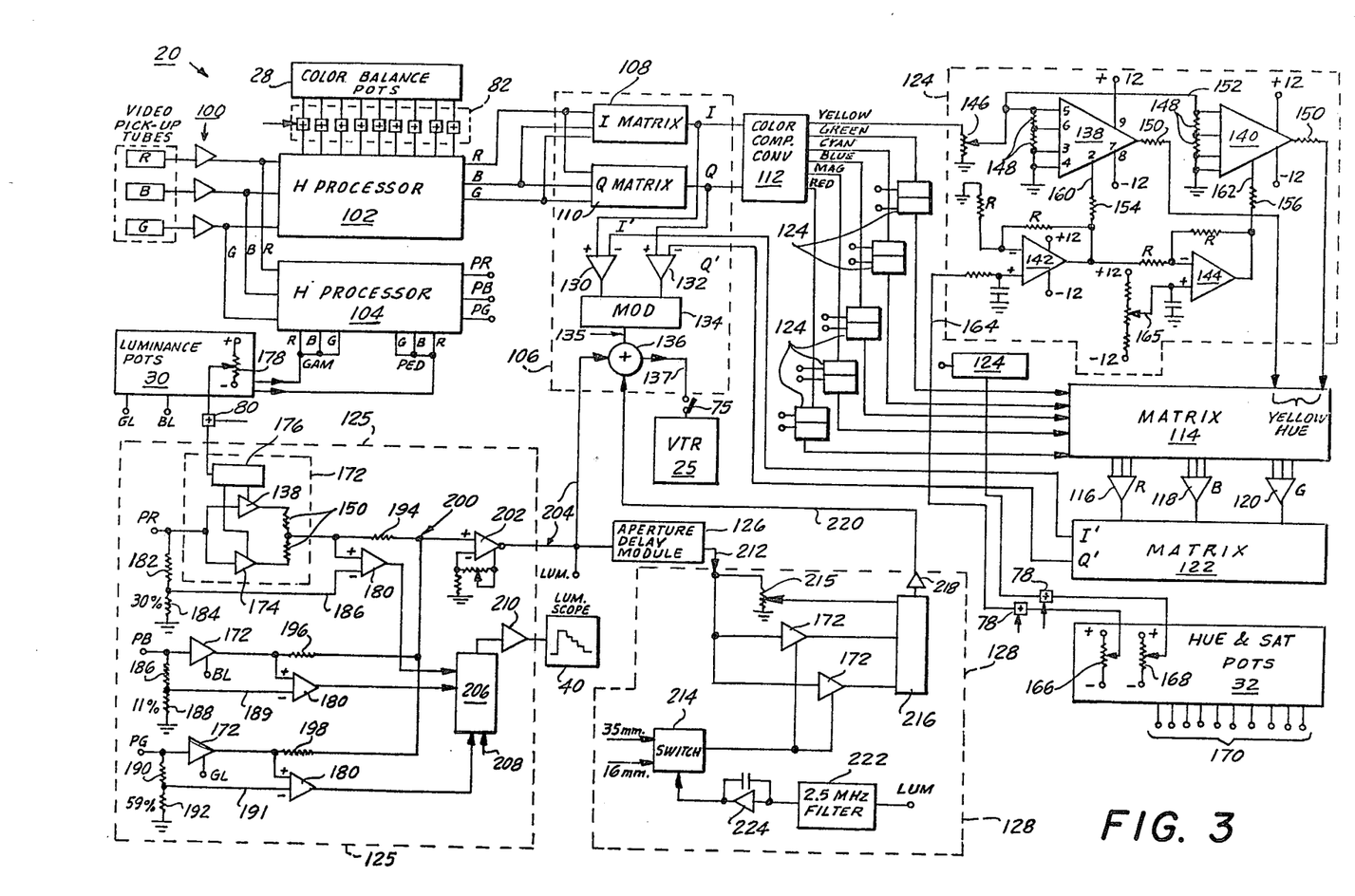
FIG. 3 is a schematic circuit diagram for a portion of the system shown in FIG. 1.

FIG. 3 is a schematic circuit diagram of the film chain unit 20, together with the three color control potentiometer units 28, 30 and 32, and some other peripheral equipment. The basic structure of the film chain unit 20 is that of the RCA type TK-28 film camera system, with certain modifications which have been made in accordance with the present invention.

The unit 20 includes three video pickup tubes R, B and G, which receive the images from the projectors and convert them into red, green and blue video signals. These signals are amplified by standard pre-amplifiers 100, and are delivered to a conventional "H Processor" 102. As it is well known, th "H Processor" operates upon the R, B, and G signals to give local and remote gain control, gamma control, black control, pedestal control, shading correction, flare correction, black and white clipping, and sampling signals for automatic operation. The color balance pots are connected to the R, G and B gain gamma and pedestal input leads to the H Processor, thus providing control of the color balance.

The processed red, blue and green signals are delivered to an encoder unit 106, known as the "colorplexer" in the RCA TK-28 unit. The colorplexer unit 106 contains an "I" matrix 108 and a "Q" matrix 110 for conversion of the processed R, B and G signals into I and Q signals. A third matrix is provided but is not shown because it is not used. Normally it is used to provide a luminance signal.

The I and Q signals are delivered out of the colorplexer unit 106 into a modified form of the RCA "Chromacomp" color correction unit. That unit includes a color component converter unit 112 which converts the I and Q signals into the three primary color components, red, blue and green, as well as the three complementary color components, yellow, cyan, and magenta. These signals are produced on lines bearing the corresponding color names. Normally, the resulting six color component signals are delivered to twelve potentiometers (not shown) and then into a matrix 114 which conducts the signals from the potentiometers to selected inputs of red, blue and green amplifiers 116, 118 and 120 whose signals are combined in a matrix 122 to produce modified I and Q signals, I' and Q'.

Actually, three matrixes and potentiometer combinations 114 are provided in the normal Chromacomp unit, and the color corrections provided by one of the matrixes can be selected by switches on the unit itself.

One of the problems met in the past is that such color corrections as were provided by the Chromacomp unit could not be used in producing continuous color-corrected video tape recordings. One problem is caused by the fact that the color correction potentiometers must be brought out of the unit by a substantial distance in order to make it feasible to adjust the color values at the control panel 22, change the settings quickly, store them in computer memory, and otherwise operate upon them in a digital computing system.

In accordance with the present invention, this problem is solved by the provision of a remotely controllable active potentiometer circuit 124. This circuit is located in the film chain unit 20, where long cables are not required to connect it into the circuit. Only D.C. signals are supplied to the circuit 124 from the hue and saturation potentiometer unit 32, thus avoiding the distortion which otherwise might be caused by conducting video signals over the same distance.

There actually are twelve of the circuits 124, but only one of them is shown in detail in FIG. 3. The other ten circuits 124 are shown in block form only, for the sake of space conservation in the drawings. There are two such circuits connected to each of the six color component lines out of the color component converter 112.

Referring to the upper right hand corner of FIG. 3, the circuit 124 includes a pair of integrated operational amplifiers 138 and 140 capable of providing amplification of A.C. signals of up to 10 MHz frequency without substantial distortion. These amplifiers are supplied with a bias resistor network 148. Their input leads are connected together by a line 152 which is connected to the wiper of a potentiometer 146 which receives the yellow signal from the color component converter 112.

The voltage gain of the amplifiers 138 and 140 is controllable by means of a D.C. signal applied on control leads 160 and 162. The numbers shown within the amplifier outline are the pin numbers of an integrated circuit amplifier, No. 1545, which has been used successfully for both amplifiers 138 and 140.

The D.C. control voltage for the circuit 124 is delivered from a hue potentiometer 166 over a line 164 to the non-inverting input lead of a first differential amplifier 142. Amplifier 142 is connected as a unity-gain follower, and is used as an input buffer. The output of amplifier 142 is delivered to input line 160 through resistor 154.

The output from amplifier 142 also is delivered to a second unity-gain differential amplifier 144. The signal is delivered to the inverting lead. A bias network including a potentiometer 165 is provided for the non-inverting lead of the amplifier 144. The bias potentiometer 165 is set at or near the maximum value of voltage to be obtained from the potentiometer 166.

Figure 6:
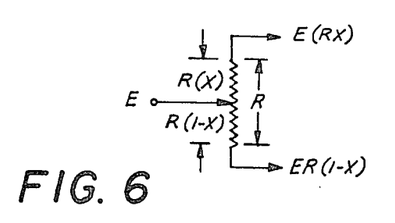
FIGS. 6 and 7 are schematic circuit diagrams used in illustrating the principles of certain operational features of the system shown in FIGS. 1 through 3.

The mode of operation of the circuit 124 is illustrated by reference to FIG. 6. FIG. 6 is a representation of the potentiometer which the circuit 124 replaces. The total resistance of the resistor of the potentiometer is R. The resistance between the upper end of the potentiometer resistor and the wiper is (X R), where X is the fractional distance of the wiper from the upper end of the resistor. Then, the resistance between the wiper and the lower end of the resistor is $R(1-X)$. If the input voltage to the wiper is E, the voltage at the upper terminal of the potentiometer will be $E(RX)$, and that the lower terminal will be $E R(1-X)$.

Referring again to FIG. 3, the D.C control signal on line 160 to control the gain of amplifier 138 will be seen to be proportional to X, the distance of the wiper of potentiometer 166 from one end of the potentiometer resistor. Therefore, the input to the inverting terminal of amplifier 144 also will be proportional to X. Since the setting of the potentiometer 165 is equal to the maximum voltage of the potentiometer 166, the output of the amplifier 144 on line 62 will be proportional to $(1-X)$. Since the gain of the amplifiers 138 and 140 is controlled by the signals on the leads 160 and 162, the signals at the outputs of the two amplifiers 138 and 140 vary in exactly the same manner as the signals at the ends of the potentiometer resistor in FIG. 6. Thus, the potentiometer of FIG. 6 has been simulated by the circuit of circuit 124 in a form which avoids transmitting video signals over long distances, thus avoiding that source of distortion, and which is compatible with a digital computer system.

The output signals from the amplifiers 138 and 140 are delivered to the yellow hue input terminals of the matrix 114. It should be understood that the terminals extending from the left sides of the block form circuits 124 are connected to the potentiometer terminals 170 of the hue and saturation potentiometer circuit 32.

The modified I and Q signals I' and Q' are delivered from the matrix 122 back to the colorplexer or encoder 106 to one input of differential amplifiers 130 and 132. Each amplifier also is supplied with the I or Q signal, respectively, from one of the matrixes 108 and 110, and the differences between the I and the I' signals, and the Q and Q' signals are delivered to a modulator circuit 134 which produces a modulated output signal on the line 135 which is known as the total chrominance signal. The chrominance signal is delivered to a summing amplifier circuit 136 where it is added vectorially to other signals to be described below to produce an output video signal, completely color corrected, on the line 137. The latter signal is delivered to the video tape recorder 25, or can be broadcast without recording.

LUMINANCE COMPONENT CONTROL

In accordance with another feature of the present invention, the spectral composition of the total luminance signal can be varied at will by vectorially adding or subtracting the R, B and G signals in varying proportions.

The R, G and B signals from the pre-amplifiers 100 are delivered to a second H Processor 104 which is substantially identical to the H Processor 102. The processed R, B and G signals are delivered over output terminals PR, PB and PG, respectively, to correspondingly lettered input terminals in a luminance control circuit 125. Each of the processed red, blue and green signals is amplified by a video frequency amplifier circuit 172 which is controllable by means of a D.C. signal provided by one of the luminance potentiometers.

Each of the processed red, blue and green signals is amplified by a video frequency amplifier 172 which is capable of being controlled by a remote D.C. signal supplied from one of the luminance potentiometers, such as potentiometer 178. The circuit 172 is substantially identical to the circuit 124 with two exceptions. The first is that the amplifier 140 is replaced with an amplifier 174 which is identical to the amplifier 140, except that it has an inverting input, and, secondly, in that the two output leads of the amplifiers are connected together. The output of the circuit is taken at the center point between the two identical resistors 150. The circuit 176 corresponds to that consisting of amplifiers 142 and 144 and associated circuitry.

Figure 7:
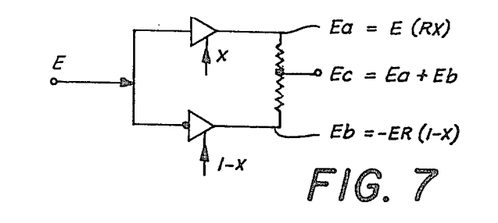

The circuit 172 functions like the circuit 124, except that it produces both positive and negative output signals whereas the circuit 124 produces signals of only one polarity. FIG. 7 shows a simplified schematic equivalent circuit diagram for the amplifier circuit 172.

The amplified outputs of the three amplifiers 152 are delivered through identical resistors 194, 196 and 198 to a junction point 200 where the three signals are added vectorially to produce an overall luminance signal. This signal is amplified by an amplifier 202 and sent over output lead 204 to the summing amplifier circuit 136, in the colorplexer unit 106.

A more nearly conventional luminance signal is developed by means of three resistor networks consisting of a first pair of resistors 182 and 184 having values so that 30% of the total resistance of the network lies between ground and the junction point between the two resistors. This network thus provides a signal whose magnitude is equal to 30% of the processed red signal on line 186.

Similarly, the network of resistors 186 and 188 provide a signal on line 189 of a value of 11% of the processed blue signal, and the network of resistors 190 and 192 produces a signal equal to 59% of the total processed green signal on line 191.

Each of the signals on lines 186 and 189 and 191 is connected to the inverting input of a differential amplifier 180 whose non-inverting input is connected to the output of the corresponding amplifer 172. The outputs of the three differential amplifiers 180 are delivered to a stepping switch 206 which is stepped at a rate of approximately 20 steps per second by means of a control signal delivered over a line 208 to deliver through an amplifier 210 to the luminance scope 40 sequentially the signals from the three amplifiers 180. This has the effect of producing a luminance waveform on the scope 40 which indicates the difference between the standard luminance curve and the actual luminance curve being produced by the circuit.

As the potentiometers in the luminance potentiometer circuit 130 are varied, during the color correction process, the percentages of processed red, processed blue and processed green are varied in the manner necessary to correct for differences between the spectral distribution of colors on the motion picture film and that found in the ojbects viewed by video camera tubes.

Two of the five potentiometers of the luminance potentiometer circuit 30 are connected to the gamma input leads for the R, B and G signals the pedestal input leads for the red, green and blue input terminals of the H processor 104. The gain of the H processor is set at unity. Thus, the two controls entitled "luminance gamma" and "luminance pedestal" shown in FIG. 1 are established. The R, B and G gamma and pedestal lines are connected together in groups as shown because it was found that separately controlling the R, B and G gamma lines had very little additional effect on the color. The same was found to be true for the separate R, G and B lines for the pedestal control.

It has been found that the luminance controls have an unexpectedly great effect on the color control for the video picture. The color correction of the luminance signal itself apparently has made a significant improvement in the art of color correction.

VARIABLE IMAGE ENHANCEMENT

The output signal from the luminance control circuit 125 is delivered to the aperture delay module 126 which is provided in the RCA TK-28 unit. However, whereas the input to the module 126 normally is the green signal from the H processor 102, in accordance with the present invention, the total luminance signal is instead used as the input signal. This is believed to provide improved performance.

The aperture delay module 126 delays the luminance signal by one line, and this delayed signal is conducted over an output lead 212 to a variable image enhancement circuit 128. The circuit 128 receives not only the signal on line 212, but also projector speed measurements signals from the circuit 58 in FIG. 1 over the lines marked 35 mm and 16 mm, through a switch 214. The switch 214 selects the appropriate one of the two input signals, in response to switching signals from the projection selector unit 56. These analog D.C. signals are supplied to the control leads of two amplifiers 172 whose constuction is shown in the left-hand portion of FIG. 3. An electronic switching circuit 216 is provided to selectively enable one of the amplifiers 172 or a potentiometer 215 to provide a selectable gain for the signal from the aperture delay module 126. The potentiometer 215 is enabled and the amplifiers 172 are disabled by the switching circuit 216 when it is desired to color correct stationary slides. Variable image enhancement is not necessary under these circumstances.

When either the 35 millimeter or 16 millimeter film projector is operating, the speed-variable image enchancer feature comes into play. One of the amplifiers 172 is enabled whereas the other amplifier 172 and the potentiometer 215 are disabled. The two amplifiers provide differing levels of gain because more gain is needed for the 16 millimeter projector than for the 35 millimeter projector. The switch 214 also is operated to select one of the two input signals desired. The input signals to the switch 214 vary directly with the speed of the respective projector. Thus, as the speed of the projector increases, the gain of the amplifier 172 increases. This sends an amplified signal over line 220 to the summing amplifier circuit 136.

Summing amplifier circuit 136 includes the aperture equalization module "C/D" of the RCA colorplexer 106, which sharpens the transitions of the luminance signal. The sharpening increases with increasing magnitudes of signals over the line 220. Thus, the amount of image enhancement increases with increasing projector speed. This is very advanatageous in that it continues to provide good contrast and definition in the video picture even at relatively high projector speeds. Moreover, the amount of image enhancement drops as the speed of the projector drops so that when a still frame is displayed in the monitor 24 (FIG. 1), it too will have proper resolution. This presents a good image on the monitor 24 and facilitates color correction.

In accordance with another feature of the invention, the luminance signal at point 204 also is supplied as an input to a 2.5 MH$_z$ narrow band filter 202. The output of the filter is rectified and smoothed by an integrator circuit 224 and is delivered through the switch 214 to the inputs of the amplifiers 172. However, the relationship between the input and the output of the filter 222 is inverted; that is, the average value of the filter output decreases with increasing levels of luminance signal, thus decreasing the amount of enhancement voltage developed with increasing luminance signal levels. The reason for this is that the amount of enhancement present is a direct function of the average signal level in a narrow band around 2.5 MH$_z$. Thus, if a relatively high average signal level at that frequency is present, less enhancement is needed, so that the gain of amplifiers 172 is reduced accordingly.

AUTOMATIC POTENTIOMETER RETURN

Figure 4:
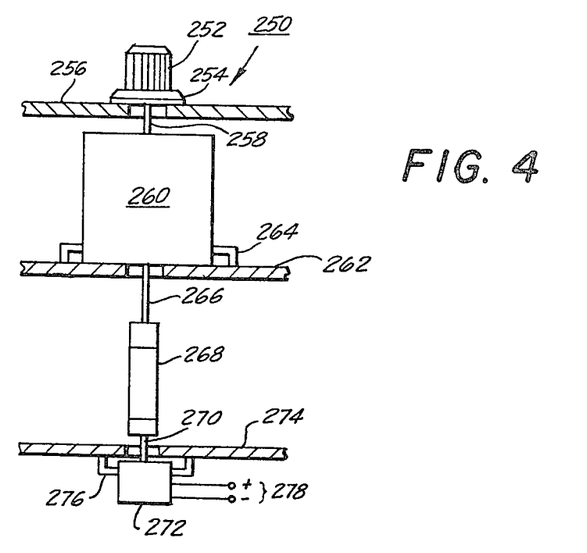
FIG. 4 is a cross-sectional view of the potentiometer construction of the system shown in FIG. 1.

FIG. 4 shows the potentiometer mounting and return structure used in the control panel 22 to quickly return the potentiometers to a starting position after a group of settings has been stored in memory. The assembly 250 is shown partially in cross-section and partially schematically.

The assembly 250 includes a knob 252 secured to a shaft 258 extending through a front panel 256 and into a magentic positioning device 260. The device 260 is mounted on a second mounting plate 262 by means of an adjustable mounting bracket 264. The lower end 266 of the shaft 258 extends through a hole in the plate 262 and is connected by means of a longitudinally extensible but tortionally rigid coupling device 268 to the shaft 270 of a high-precision potentiometer 272. The potentiometer 272 is mounted with its shaft 270 extending through a hole in a third mounting plate 274, and is adjustably positioned and supported with respect to the plate 274 by a mounting bracket 276.

Figure 5:
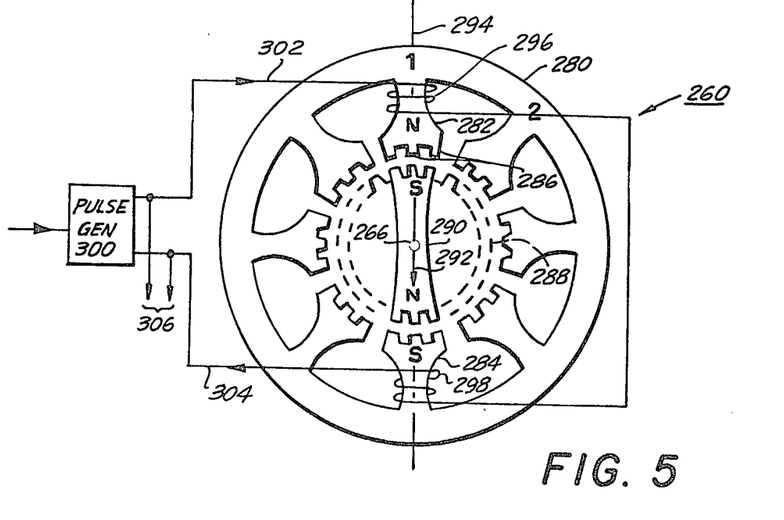
FIG. 5 is a partially cross-sectional schematic drawing illustrating the principle of operation of a portion of the device shown in FIG. 4.

The magnetic positioning device 260 is shown in schematic form in FIG. 5. FIG. 5 is a schematic cross-sectional view looking downwardly at the device 260.

The device 260 includes a cylindrical stator 280 with a plurality of pole pieces 284 extending radially toward a cylindrical rotor 288. The surface of the rotor has longitudinal grooves 286 which match the grooves 286 in the pole pieces of the stator. Thus, both the rotor and the stator have matched teeth on their surfaces. The spacing of the teeth on the rotor 288 is the same as the spacing between teeth in a given pole piece 282, although the spacing of the groups of teeth on the rotor is somewhat different from the spacing of the groups of teeth on the stator.

The rotor 288 is mounted on the shaft 266 and is permanently magnetized in a sense so that it effectively produces a permanent magnet having the outlines and polarity indicated at 290 in FIG. 5. The north-south axis 292 of this magnet is vertical in FIG. 5.

The two opposite pole pieces 282 and 284 are wound with windings 296 and 298, respectively, in a manner such that when a D.C. pulse is supplied as indicated through input leads 302 and 304 to the series connected windings 296 and 298, a strong electro-magnetic field having the polarity indicated in FIG. 5 is produced. The axis of the lines of force of this field is indicated at 294.

A pulse generator 300 supplies a sharp D.C. pulse to the windings 296 and 298 in response to depression of the "mark event" pushbutton shown in FIG. 2, and a vertical synch signal from the synch circuit 92. When the knob 252 has been rotated to an angular position in which the two magnetic fields are out of alignment with one another, the rotor is very rapidly attracted towards the position shown in FIG. 5 in which the fields are completely aligned with one another. By initial adjustment, the zero position of the wipe shaft 270 of the potentiometer 272 shown in FIG. 4 is aligned with the position of the axes 294 and 296 when they are aligned. Thus, the potentiometer 272 quickly will be returned to its starting position (zero) regardless of whether it has been turned clockwise or counter-clockwise, and this will be accomplished within a maximum of 1.8 milliseconds. Thus, the return to zero is accomplished rapidly during the video vertical interval so that it does not interfere with the video picture.

Overshoot past the zero position is prevented by the simple expedient of providing a felt pad 254 between the lower surface of the knob 252 and the front panel 256 to provide frictional damping of the movement of the knob 252.

The accuracy and precision of positioning of the rotor relative to the stator in the starting position is quite high. This precision can be maintained with approximately 1% accuracy. The reason for this is the toothed structure. In effect, each opposed pair of teeth provides a separate smalll magnet which becomes aligned with its opposite counterpart, thus very accurately locating the potentiometer at its zero starting position after each use in a color correction step.

It is evident that the system and method of the invention as described above meets the objectives set forth at the beginning of this specification. The system and method are quite versatile and flexible in correcting color. Furthermore, the equipment is fast and relatively easy to use, and actually is capable of saving labor by facilitating re-use of previously-stored color corrections. It is believed that the quality of color corrections provided by the system and method is at a level not previously attained.

The above description of the invention is intended to be illustrative and not limiting. Various changes or modifications in the embodiments described may occur to those skilled in the art and these can be made without departing from the spirit or scope of the invention.

We claim:

1. In a system for converting photographic images to video signals, said system including projector means for presenting and projecting images sequentially at a variable rate, video camera means for converting said images into video signals, aperture delay means for producing contours signals for image enhancement, the improvement of rate-responsive variable enhancement means for amplifying said contours signals in an amount which is a direct function of the rate of presentation of said images by said projector means.

2. A device as in claim 1 including means for detecting said rate and providing electrical rate signals proportional to said rate, amplifier means for amplifying said contours signals under the control of said rate signals, means for developing a luminance signal, means for detecting the approximate average value of said luminance signal in a relatively narrow frequency band about 2.5 MHz, and means for reducing the amplification of said amplifier means in an amount which is proportional to said average value.

3. A device as in claim 1 including a first amplifier for use with 35 mm motion picture film, a second amplifier with different gain for use with 16 mm motion picture film, and selector means for selectively enabling one of said amplifiers in accordance with the size of motion picture film being converted.

4. A device as in claim 1 including circuit means for setting a fixed level for said contours signal for the conversion of still pictures to video, and selector means for selectively enabling said circuit means.

5. A device as in claim 1 in which said video camera means includes luminance signal generating means, said aperture delay means being connected to receive said luminance signal, chrominance signal means, and means for adding the output of said variable enhancement means to said chrominance signal to produce a composite video signal.

* * * * *